(12) United States Patent
Mansoorian

(10) Patent No.: US 7,119,839 B1
(45) Date of Patent: Oct. 10, 2006

(54) HIGH RESOLUTION CMOS CIRCUIT USING A MATCHED IMPEDANCE OUTPUT TRANSMISSION LINE

(75) Inventor: Barmak Mansoorian, Pasadena, CA (US)

(73) Assignee: Micron Technology, Inc., Boise, ID (US)

( * ) Notice: Subject to any disclaimer, the term of this patent is extended or adjusted under 35 U.S.C. 154(b) by 0 days.

(21) Appl. No.: 09/359,056

(22) Filed: Jul. 21, 1999

Related U.S. Application Data

(60) Provisional application No. 60/093,835, filed on Jul. 22, 1998.

(51) Int. Cl.
  H04N 5/335 (2006.01)
  H04N 5/228 (2006.01)
  H03K 17/16 (2006.01)
  H03K 9/175 (2006.01)
  H01P 5/08 (2006.01)

(52) U.S. Cl. .......... 348/308; 348/294; 348/222.1; 326/30; 326/82; 333/17.3

(58) Field of Classification Search ........ 348/294–324; 333/17.3, 32; 365/51; 250/208.1; 326/30, 326/82; 327/379–391
See application file for complete search history.

(56) References Cited

U.S. PATENT DOCUMENTS

| | | | | |
|---|---|---|---|---|
| 4,441,080 A * | 4/1984 | Saari | .......... | 330/86 |
| 4,719,369 A * | 1/1988 | Asano et al. | .......... | 326/86 |
| 4,859,880 A * | 8/1989 | Chung et al. | .......... | 326/86 |
| 5,050,194 A * | 9/1991 | Pickering et al. | .......... | 327/7 |
| 5,264,744 A * | 11/1993 | Mizukami et al. | .......... | 333/32 |
| 5,512,853 A * | 4/1996 | Ueno et al. | .......... | 327/379 |
| 5,656,952 A * | 8/1997 | McCall et al. | .......... | 326/82 |
| 5,739,714 A * | 4/1998 | Gabara | .......... | 326/27 |
| 5,760,601 A * | 6/1998 | Frankeny | .......... | 326/30 |
| 5,767,699 A * | 6/1998 | Bosnyak et al. | .......... | 326/30 |
| 5,811,984 A * | 9/1998 | Long et al. | .......... | 326/30 |
| 5,886,659 A * | 3/1999 | Pain et al. | .......... | 348/292 |
| 5,898,168 A * | 4/1999 | Gowda et al. | .......... | 348/249 |
| 5,933,041 A * | 8/1999 | Sessions et al. | .......... | 327/379 |
| 6,075,384 A * | 6/2000 | Sim et al. | .......... | 326/82 |
| 6,344,765 B1 * | 2/2002 | Taguchi | .......... | 327/333 |

OTHER PUBLICATIONS

H.B. Bakoglu, Circuits, Interconnections, and Packaging for VLSI, Addison-Wesley VLSI Systems Series, 1990.

* cited by examiner

Primary Examiner—David Ometz
Assistant Examiner—Nhan T. Tran
(74) Attorney, Agent, or Firm—Dickstein Shapiro LLP

(57) ABSTRACT

Image sensor with CMOS output, an another circuit receiving input. The circuit operates like a transmission line, in current mode, with substantially zero voltage. The impedances are matched by setting bias currents.

14 Claims, 9 Drawing Sheets

HIGH RESOLUTION CMOS CIRCUIT USING A MATCHED IMPEDANCE OUTPUT TRANSMISSION LINE

CROSS REFERENCE TO RELATED APPLICATIONS

This application claims the benefit of the U.S. Provisional Application No. 60/093,835, filed on Jul. 22, 1998.

BACKGROUND

CMOS active pixel sensor cameras can produce a digital output.

While digital outputs are often relatively noise insensitive, the noise can couple to the analog part of the circuit and cause problems there. Different techniques of minimizing this noise are known in the art.

One way to address the noise is to use current mode transmission of voltages. The current mode transmission can be configured to operate with less noise in certain circuits. However, when current mode transmission is used, other problems can occur. One such problem is a so called ground bounce caused by surges in the power supply.

SUMMARY

The present system teaches a new way of transmitting data from an image chip. This system can increase the signal-to-noise ratio to thereby increase the rate at which the digital data can be taken off the chip. This enables supporting higher frame rates with high special resolution.

BRIEF DESCRIPTION OF THE DRAWINGS

These and other aspects will now be described in detail with the accompanying drawings, wherein.

DESCRIPTION OF THE PREFERRED EMBODIMENT

Figure 1:
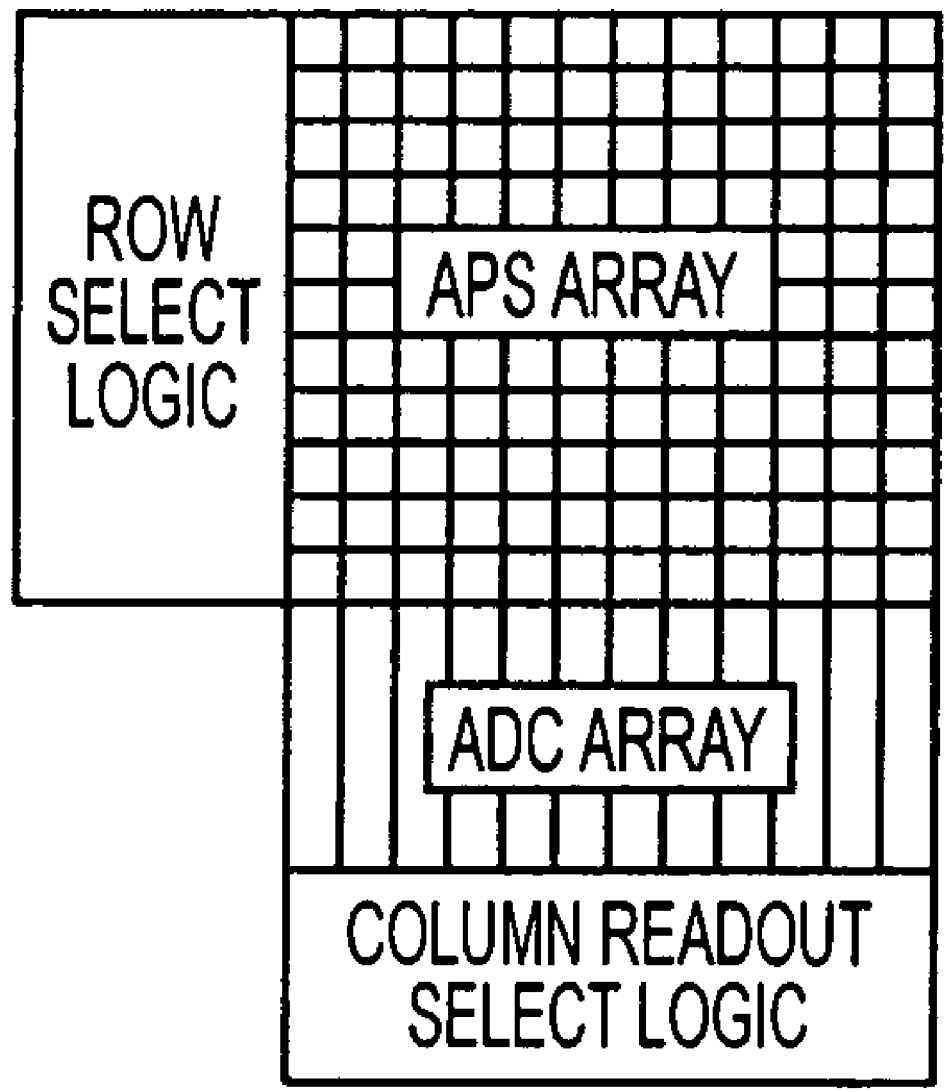
FIG. 1 shows a basic active pixel sensor architecture.

A disclosed active pixel sensor architecture is shown in FIG. 1. This active pixel sensor uses a column parallel approach where an entire column of information is digitized at any one time. More generally, any group of information, where the group could be a column, a partial column, row, partial row or any other group of information, can be simultaneously digitized.

In the architecture shown, the data is digitized at the bottom of each pixel column. The digitized data is then serialized in the internal bus. Data is transmitted through digital output circuitry.

In this disclosed mode, the digitized data is transmitted at 100 megahertz and sent to the imager output pads. This data is then transmitted off the chip.

One bottleneck is caused by the rate at which this digital data can be taken off the imager chip. The design requirements for the I/O circuitry are often more stringent than those in the internal chip. This is because the I/O circuits must be able to drive loads that have large and often unknown parasitic components. The parasitic components can include both capacitive and inductive components. However, the combination of inductive and capacitive parasitics create second order systems that can have ringing oscillatory behavior at the high transmission frequencies.

Figure 2:
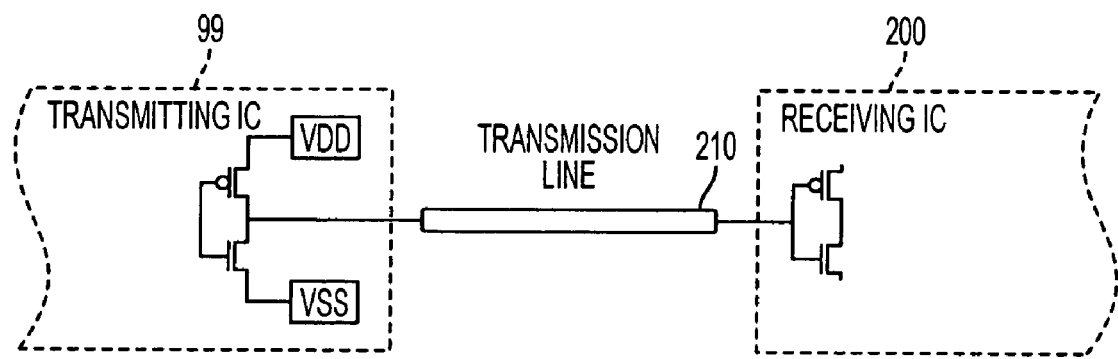
FIG. 2 shows a conceptual diagram of current CMOS input/output when viewed as a transmission line.

The present inventor recognized that the output can be considered as a transmission line. Proper handling of the termination can minimize ringing and oscillatory behavior. The IC 99 shown in FIG. 2 is transmitting to a receiving IC 200. A transmission line 210 connects the transmitting IC 99 to the receiving IC 200.

Figure 3A:
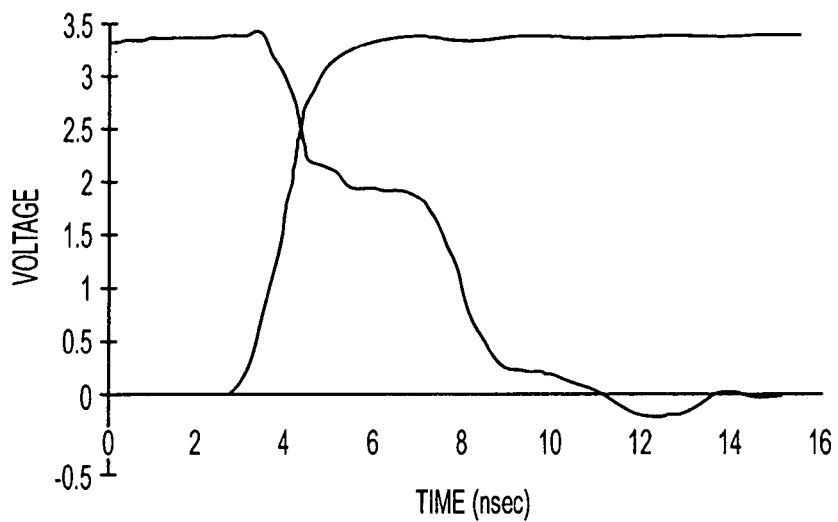
FIGS. 3a and 3b show the ground bounce in the CMOS I/O of FIG. 2.
Figure 3B:
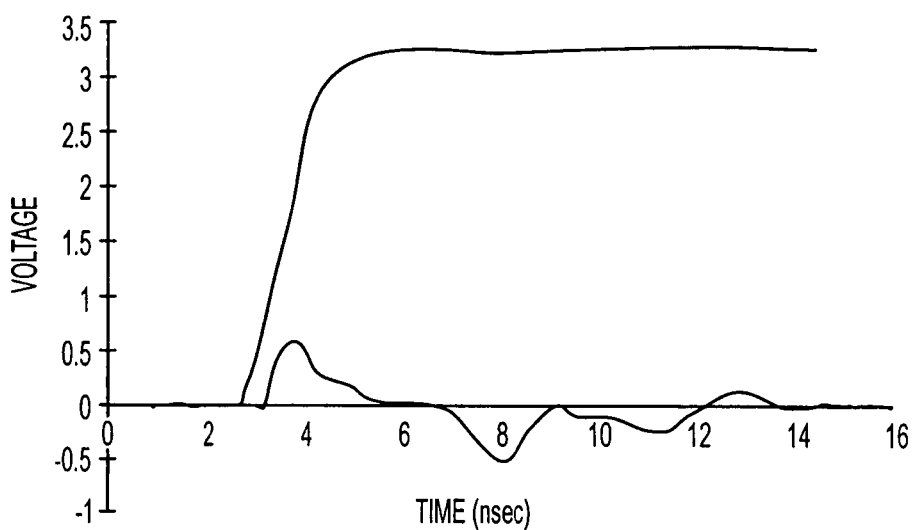

Typical CMOS output circuitry, however, is often not suitable for this transmission line environment. FIG. 2 shows the situation of an unterminated CMOS transmission line. FIGS. 3A and 3B shows respectively the output waveforms when driving coax cable and the glitch voltage at the transmitter ground line. FIG. 3A shows the transmission sequence at the output of an unterminated CMOS line. In this system, a voltage equal to VDD/2 is launched into the line at the beginning of the transmission. This voltage travels into the unterminated receiver 200, and at that point is doubled and reflected back. A one-foot length of 50 ohm coaxial cable has a flight time of about 5 nanoseconds. This time increases linearly with the physical length of the cable.

This system, while usable, has certain drawbacks. The output bandwidth is limited. Moreover, the transmitter must wait for the duration of the flight time before attempting another transition. Also note that the output buffer must supply a current during the entire flight time. This can increase the power consumption of the CMOS output.

FIG. 3b shows the voltage in the receiving IC 200. The ground level bounces to add a few hundred millivolts. This can add significant noise onto the voltage output.

Further complication is caused by the characteristic of CMOS that draws current only during the output voltage transitions. Because of the switching variation, there are large variations in current. These variations in current can cause ground bounce and can cause voltage glitches v on the line, of magnitude V=L di/dt where L is the inductance of the signal and/or ground bounce. FIG. 3b shows these glitches in a single output buffer during a transition. While this diagram is only exemplary, it illustrates the general proposition that a unterminated transmission line will include a reflection, and that the switching techniques of CMOS can also cause ground bounce in this way.

When several buffers switch in tandem, as often happens during digital transmission where multiple bits change state at once, the glitch energies could add. This noise in the power supply line can couple into the analog circuitry in the imager, and can corrupt the pixel outputs.

Figure 4:
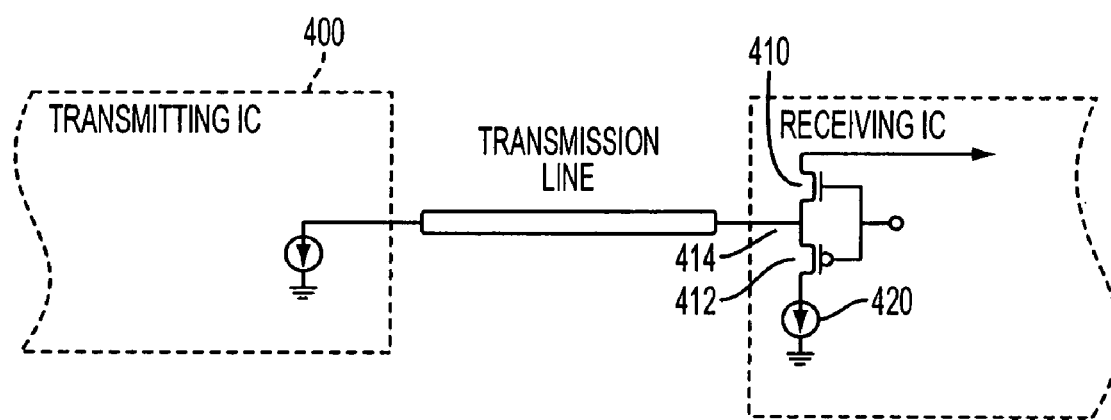
FIG. 4 shows a new transmission line mode of CMOS I/O.

The problem is addressed by circuit of FIG. 4 which shows a current mode signaling system. The voltage swing at the output of a current mode driver can be low or zero, e.g.

less than 0.5 volts. This allows the receiver end of the line to be terminated without a large increase in power consumption.

The circuit of FIG. 4 can also use a differential mode output. In this situation, the current drawn from the supply is constant. This minimizes glitches on the VDD and on the ground line.

The transmitting IC 400 in FIG. 4 drives its transmission line in the form of signal current. The receiver includes, as shown, two common source CMOS transistor pairs, each including an n transistor 410 and p-type transistor 412. The CMOS pair receives the signals at its common source terminal. The drain of the PMOS transistor 412 is biased with a constant current and the output is defined by the drain of the second NMOS transistor. The input impedance for this receiver is defined as the parallel impedance seen at the sources of the n and p channel transistors.

The impedance can be set by adjusting the bias current through the transistors via the current source 420. Once set, the impedance becomes relatively independent of the input current through the configuration. Since the impedance is relatively constant, the reflected signal is minimized and hence transmission speed can be increased.

Figure 5:
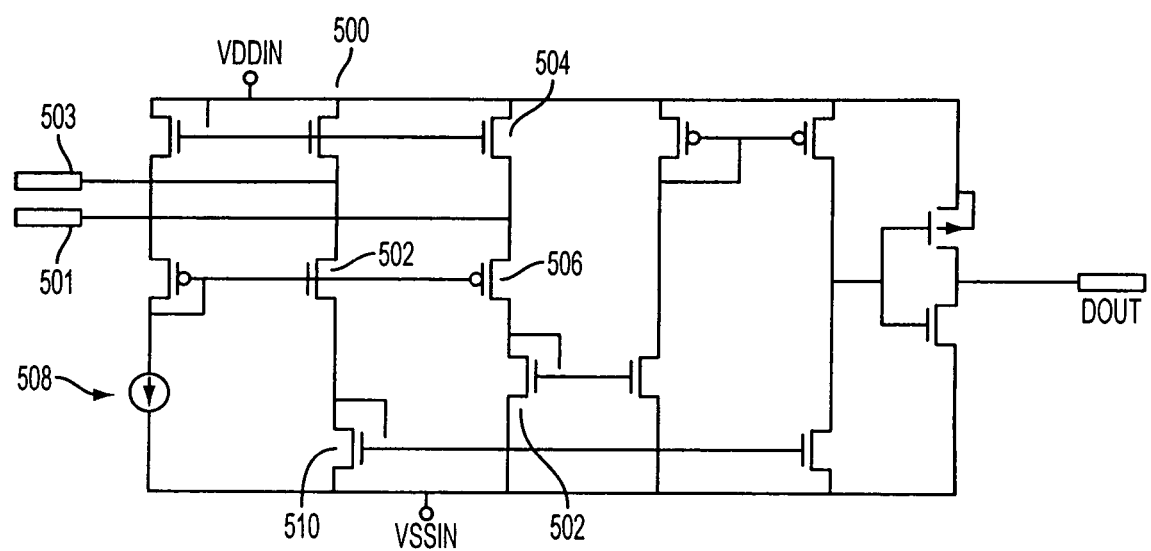
FIG. 5 shows a schematic of a receiver circuit.

A more detailed schematic of the receiver circuit 410 is shown in FIG. 5. Common source transistors 500, 502 receive the signal at their connected source terminals. The current signal is then mirrored in mirror transistor 504, to form a conventional CMOS logic level. The input impedance for this circuit is set by bias current through current source 508. In this embodiment, the bias current is sent to 3 ma, although the bias current can be changed for different applications.

The circuit 410 shows a dual-ended differential input, with one part on line 503, and the other part on line 501 driving common source transistors 504, 506. Each of the current mirrors 510, 512 change the current to a conventional CMOS level. The circuit can also be used in a single ended mode, by sending only a single line of information.

Figure 6:
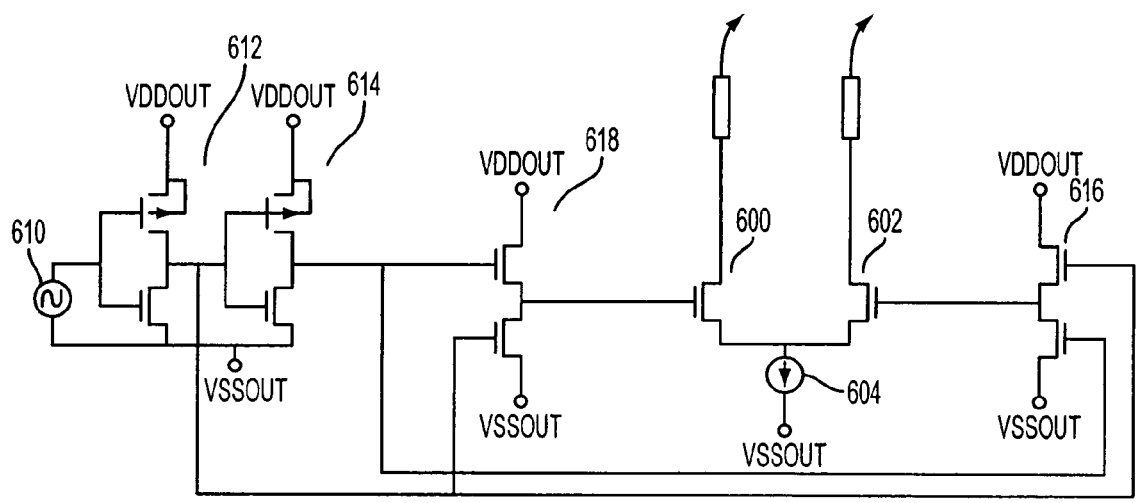
FIG. 6 shows a first transmitter circuit using all CMOS components.

The output drivers can operate in a current mode output driver mode. FIG. 6 shows a first embodiment using a differential pair 600, 602 with open drains that form the differential output. The output impedance of the receiver serves as the load for this circuit. The circuit steers a current that is determined by the bias current source 604 for full differential operation. The logic low level corresponds to negative I bias, and logic high level corresponds to no current.

Figure 7A:
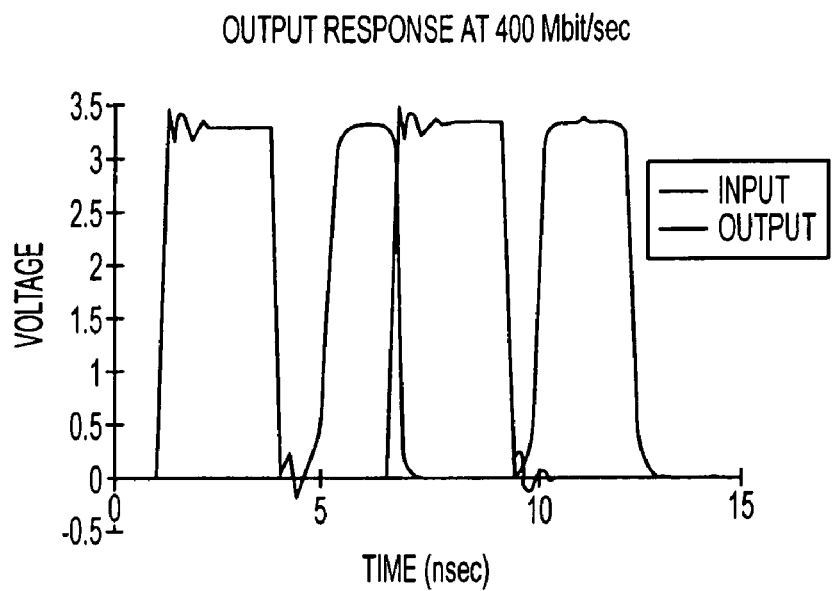
FIGS. 7a and 7b show waveforms for the FIG. 6 transmitter circuit.
Figure 7B:
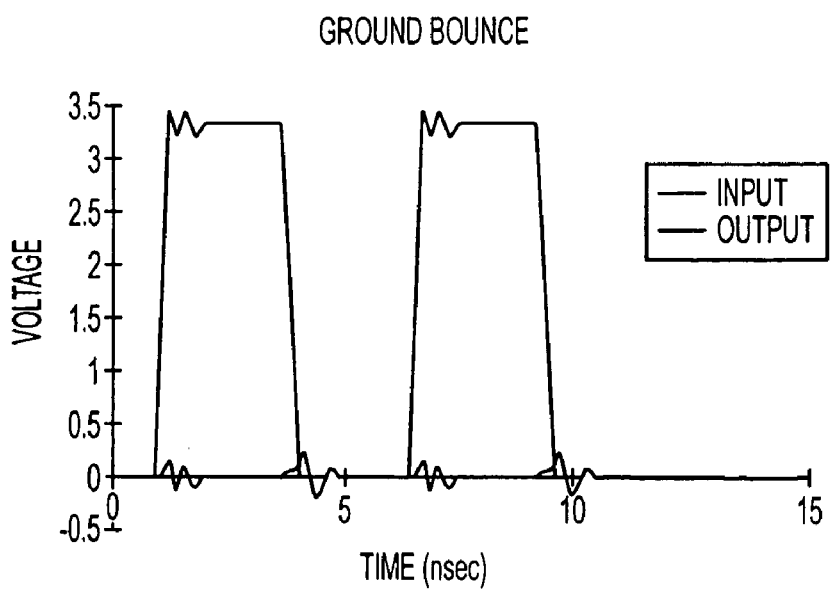

FIG. 7A shows the output waveform of the circuit when driving a 50 ohm, 1 foot coax cable. FIG. 7B shows the ground glitches which are much less than in the previous circuit. The input CMOS voltage 610 is first connected to two CMOS transistor pairs 612, 614. The output of the first stage 612 is buffered by a follower 616, and input to one gate of transistor 602 of the differential pair 600/602.

The voltage $V_{IN}$ is again inverted by the second CMOS transistor pair 614 and input to a second follower 618. Hence, this first current design includes CMOS transistors to buffer and invert the signal as well as two differential followers arranged in a push-pull arrangement, driving a differential pair.

Figure 8:
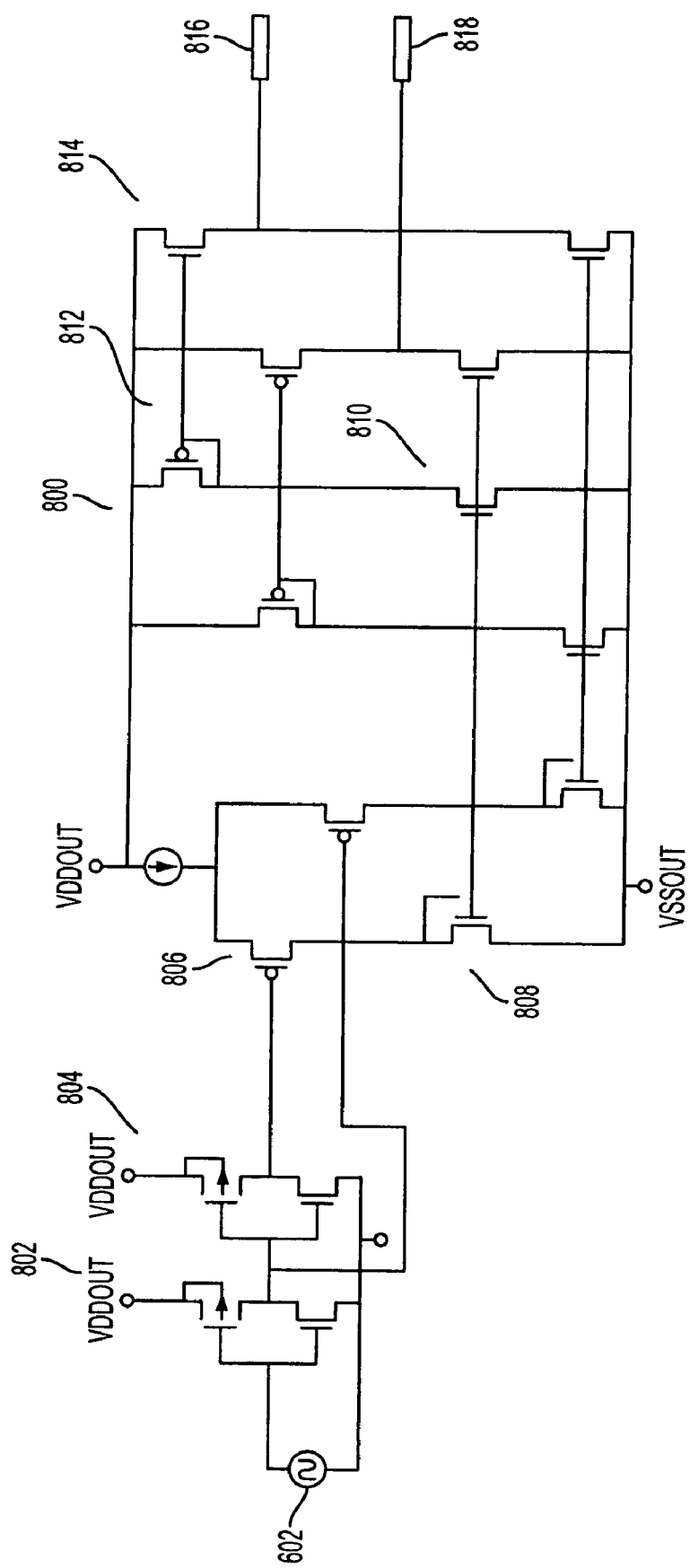
FIG. 8 shows a second transmitter circuit using CMOS components and a class A amplifier.

The second embodiment, shown in FIG. 8, connects the input CMOS circuit current 604 through a single class A amplifier 800. Again, the input voltage is buffered by first CMOS transistor pair 802, and a second CMOS transistor pair 804 to form both an inverted and a non-inverted signal. These signals are connected to PMOS transistors 806 which are connected to current mirror 808. The output of the current mirror 808 drives the base of a class A transistor 810 which is itself current mirrored by transistor 812. The current mirroring by 812 drives a PMOS transistor 814 that produces the output voltage. A corresponding negative operation to the above produces the negative output voltage 818.

Figure 9A:
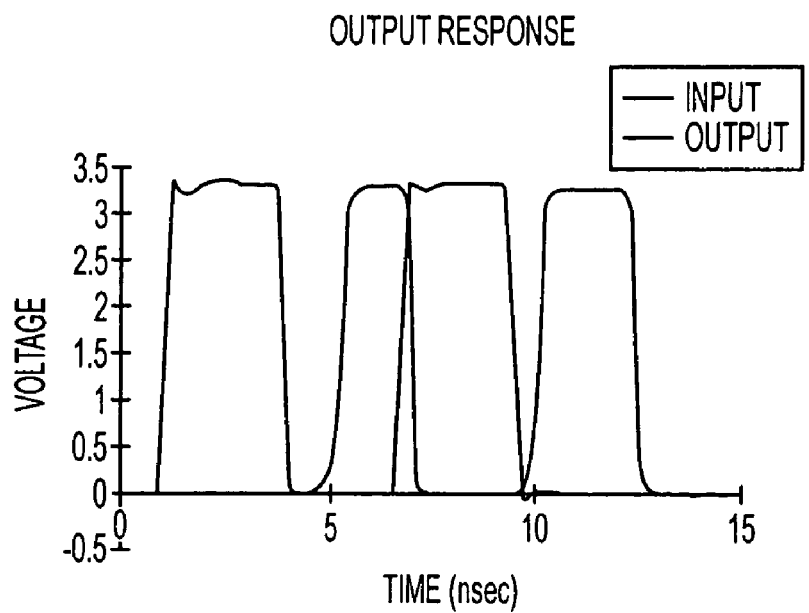
FIGS. 9a and 9b show waveforms of the circuit of FIG. 8.
Figure 9B:
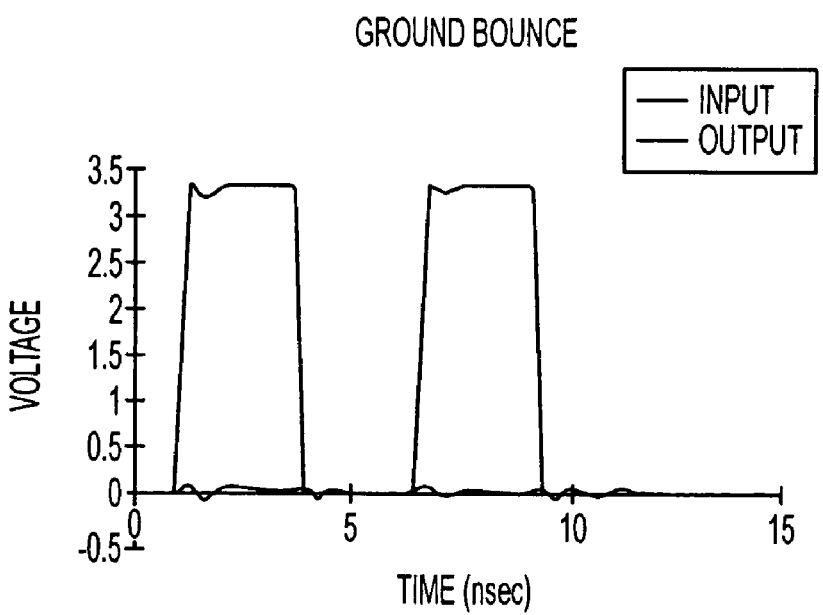

FIG. 9A shows a exemplary output, and FIG. 9B shows the exemplary ground bounce of such a circuit.

This second embodiment has the additional advantage that is produces a CMOS compatible output voltage when connected to a CMOS IC with high gate impedance.

|  | Power Consumption mWatts | Ground Bounce mVolts | Bidirectional Operation |
|---|---|---|---|
| Conventional CMOS | 33 | 600 | No |
| Current Mode Design I | 10 | 200 | Yes |
| Current Mode Design II | 21 | 100 | Yes |

Although only a few embodiments have been described in detail above, other embodiments are contemplated by the inventor and are intended to be encompassed within the following claims. In addition, other modifications are contemplated and are also intended to be covered.

What is claimed is:

1. An image sensor, comprising:
   an image acquisition portion;
   an image processing portion, receiving image information from said image acquisition portion, said image processing portion including a CMOS circuitry with CMOS differential outputs having an output impedance;
   an image receiving portion, having at least a pair of transistors and an input impedance, receiving said image information from said CMOS outputs, said image processing portion producing a current mode output and said image receiving portion receiving said current mode output; and
   an active impedance matching device having a current source, said active impedance matching device being adapted to match said output impedance of said image processing portion to said input impedance of said image receiving portion by adjusting, with said current source, a bias current through said at least a pair of transistors.

2. A sensor as in claim 1 wherein said impedance matching device comprises a circuit on said image processing portion.

3. A sensor as in claim 2 wherein an output circuit of said image processing portion includes a transistor adapted to receive a current bias, wherein a magnitude of the current bias sets the output impedance of said image processing portion.

4. A sensor as in claim 1 wherein said impedance matching device comprises a circuit on said image receiving portion.

5. A sensor as in claim 1 wherein said impedance matching portion comprises a first circuit on said image processing portion and a second circuit on said image receiving portion.

6. A sensor as in claim 5 wherein said first and second circuits include respective elements adapted to receive respective current biases, and wherein respective magnitudes of the current biases set the respective impedances.

7. A sensor as in claim 1, wherein said image receiving portion includes a current mirror part, that mirrors an input current.

8. A sensor as in claim 1 wherein said image acquisition portion is an active pixel sensor with a photosensor, an in-pixel buffer, and an in pixel select transistor.

9. A sensor comprising:
an image acquisition portion;
an image processing portion, receiving image information from said image acquisition portion, said image processing portion including a CMOS circuitry with CMOS differential outputs having an output impedance;
an image receiving portion, having an input impedance, receiving said image information from said CMOS outputs, said image processing portion producing a current mode output and said image receiving portion receiving said current mode output;
an active impedance matching device, said active impedance matching device being adapted to match said output impedance of said image processing portion to said input impedance of said image receiving portion by adjusting a bias current with a current source through at least one biased device in a way that renders said input impedance relatively independent of an input current; and
a current mode driver having an output voltage swing of less than 0.5 volts.

10. A sensor comprising:
an image acquisition portion;
an image processing portion, said image processing portion being adapted to receive image information from said image acquisition portion at a differential input; and
an impedance matching device, said impedance matching device being adapted to match an output impedance of said image acquisition portion to an input impedance of said image processing portion by adjusting bias current through at least one biased device in a way that renders said input impedance relatively independent of an input current; and
a current mode driver having an output voltage swing of less than 0.5 volts, wherein said image acquisition portion and said image processing portion each operate in current mode.

11. An image sensor, comprising:
an image acquisition portion, wherein said image acquisition portion is an active pixel sensor with a photosensor, an in-pixel buffer, and an in pixel select transistor;
an image processing portion, receiving image information from said image acquisition portion, said image processing portion including a CMOS circuitry with CMOS differential outputs having an output impedance;
an image receiving portion, having an input impedance, receiving said image information from said CMOS outputs, said image processing portion producing a current mode output and said image receiving portion receiving said current mode output; and
an active impedance matching device, said active impedance matching device being adapted to match said output impedance of said image processing portion to said input impedance of said image receiving portion;
wherein said image acquisition portion and said image processing portion operates at substantially zero voltage.

12. An image sensor, comprising:
an image acquisition portion;
an image processing portion having a current source, said image processing portion being adapted to receive image information from said image acquisition portion at a differential input; and
an impedance matching device having a current source, said impedance matching device being adapted to match an output impedance of said image acquisition portion to an input impedance of said image processing portion by adjusting bias current, from said current source, through said at least a pair of transistors in a way that renders said input impedance relatively independent of an input current.

13. An image sensor as in claim 12, wherein said image acquisition portion and said image processing portion each operate in current mode.

14. An image sensor, comprising:
an image acquisition portion;
an image processing portion, said image processing portion being adapted to receive image information from said image acquisition portion at a differential input; and
an impedance matching device, said impedance matching device being adapted to match an output impedance of said image acquisition portion to an input impedance of said image processing portion by adjusting bias current through at least one biased device in a way that renders said input impedance relatively independent of an input current;
wherein said image acquisition portion and said image processing portion each operate in current mode, and
wherein said image acquisition portion and said image processing portion operate at substantially zero voltage.

* * * * *